Dec. 10, 1968   EIICHI HIROTA ETAL   3,415,751
MANGANESE-ZINC FERRITES
Filed Oct. 22, 1965
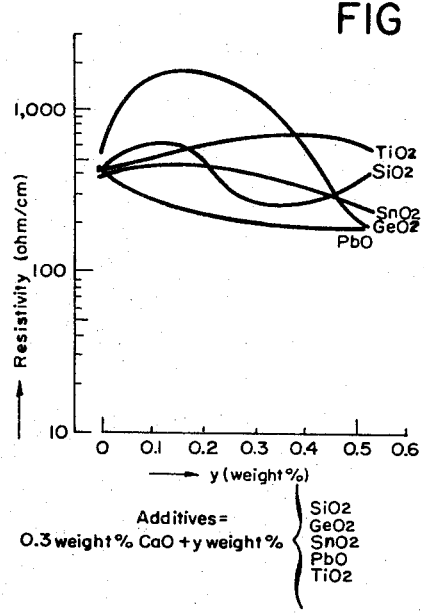
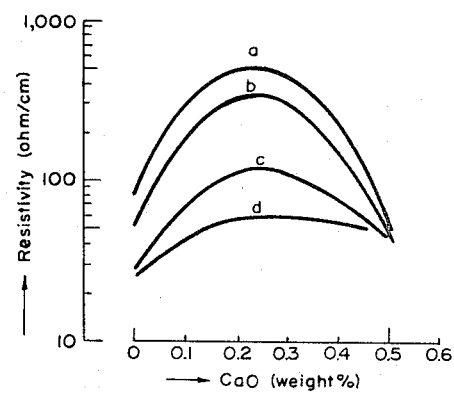
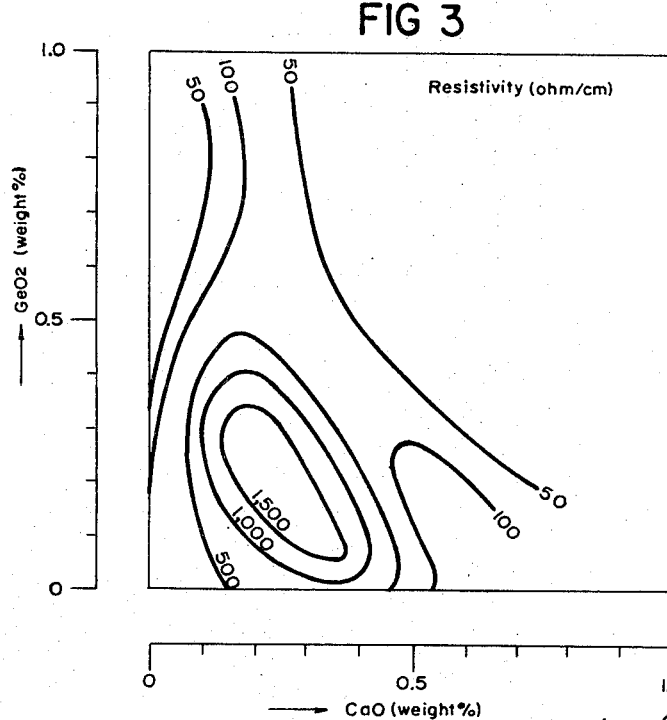
Eiichi Hirota
Yutaka Neichi
INVENTORS
BY Wenderoth, Lind and Ponack
ATTORNEYS

United States Patent Office 3,415,751
Patented Dec. 10, 1968

3,415,751
MANGANESE-ZINC FERRITES
Eiichi Hirota, Sakai-shi, Osaka-fu, and Yutaka Neichi, Hirakata-shi, Osaka-fu, Japan, assignors to Matsushita Electric Industrial Co., Ltd., Osaka, Japan
Filed Oct. 22, 1965, Ser. No. 500,548
Claims priority, application Japan, Nov. 27, 1964, 39/67,351
2 Claims. (Cl. 252—62.59)

ABSTRACT OF THE DISCLOSURE

A sintered composition consisting essentially of (a) manganese-zinc ferrite which consists essentially of 54 to 65 mol percent of $Fe_2O_3$, 4 to 22 mol percent of ZnO and the balance being MnO, and (b) as an additive combination, 0.05 to 1 percent by weight of $GeO_2$ and 0.05 to 1% by weight of CaO, is a manganese-zinc ferrite material having both a low magnetic loss and a high permeability at frequencies ranging from 300 kilocycles to 3 megacycles, and is useful as a core material for various type inductors, transformers, antennae and tuners.

---

This invention relates to soft ferromagnetic ferrite materials for telecommunication purposes, such as for use in cores of various type inductors, transformers, antennae and tuners.

More specifically the invention relates to a new and improved composition of manganese-zinc ferrite material having both a low magnetic loss and a high permeability at frequencies ranging from 300 kilocycles to 3 megacycles.

A manganese-zinc ferrite, as is well known, has the highest permeability of all the ferrites and is one of the technically most important ferrites as core materials. The manganese-zinc ferrite containing more than 50 mol percent of $Fe_2O_3$ is known to have an extremely low value or even zero of magnetocrystalline anisotropy and magnetostriction constant, and therefore is expected to have a high permeability. The electrical resistivity of said ferrite, however, is of an extremely low value, such as 10 ohm-cm. It is known that a decrease in the resistivity makes the eddy current loss higher, and then the value of $\mu \cdot Q$ lowers markedly at higher frequencies than 100 kilocycles, $\mu$ representing magnetic permeability and Q being the ratio of inductive reactance to effective series resistance. Therefore, these ferrites can scarcely be used in a magnetic core for such high frequency use.

It is an object of the present invention to provide manganese-zinc ferrites having a high initial permeability with larger values of $\mu \cdot Q$ than that of prior ferrites at frequencies ranging from 300 kc./s. to 3 mc./s. This invention contemplates to provide ferrites having the following high-frequency characteristics: (1) magnetic permeability of said ferrites is from 500 to 1000 and the value of $\mu \cdot Q$ is higher than 100,000 at 500 kc./s.; (2) the magnetic permeability is from 500 to 1000 and the value of $\mu \cdot Q$ is higher than 50,000 at 1 mc./s.; and (3) magnetic permeability is from 500 to 1000 and the value of $\mu \cdot Q$ is higher than 20,000 at 3 mc./s.

Particularly, an object of the present invention is to provide ferrites having extremely low eddy-current and hysteresis losses.

A further object of the present invention is to provide ferrites having a small temperature coefficient of the initial permeability at temperatures ranging from —40° C. to 100° C.

Methods of manufacture of a manganese-zinc ferrite having small eddy current and hysteresis losses without appreciable reduction of initial permeability at a frequency below 300 kc./s. are described in U.S. Patents Nos. 2,903,429 and 3,106,534. Guillaud found that an addition of a small amount of calcium oxide considerably reduced the eddy current loss of the ferrite. Akashi reported that the eddy current loss of ferrites made from high purity raw materials was not improved by an addition of calcium oxide, but the combined addition of both silicon dioxide and calcium oxide considerably improved the value of $\mu \cdot Q$ of manganese-zinc ferrite.

It is necessary that ferrites which have a high permeability and are applicable at a frequency higher than 300 kc./s. exhibit a higher Curie temperature and larger saturation magnetization, because the dispersion frequency of initial peremability is required to be higher.

The present invention is based on our discoveries relative to the effects of various additives and heat treatments on the high frequency characteristics of manganese-zinc ferrites in various compositions. The basic constituents of the present ferrite comprise the mixture of 54 to 65 mol percent of $Fe_2O_3$, 4 to 22 mol percent of ZnO and 42 to 13 mol percent of MnO. Where the amount of $Fe_2O_3$ is less than 54 mol percent, the value of Q of the ferrites becomes too low to maintain the value of $\mu \cdot Q$ as high as that of the present invention. On the other hand, a ferrite containing more than 65 mol percent of $Fe_2O_3$ or less than 5 mol percent of ZnO exhibits a permeability lower than 500. A high amount of ZnO more than 22 mol percent decreases the value of Q and thus remarkably reduces the value of $\mu \cdot Q$. The percentage of impurities initially contained in these several oxides is less than 0.05 percent by weight except for the silica content which may range from 0.05 to 0.07 percent by weight.

The ferrites are prepared in the usual way, either by joint or partial precipitation, from corresponding metal salt solutions or, as is customary in the ceramic arts, they are prepared for further processing by wet milling and mixing of the respective metal oxides. The powdered mixtures thus obtained, are given the desired form either immediately after drying by dry pressing, extruding, or similar method, or it may be desirable, before ceramic forming, to proceed with a calcining firing of the entire composition or only a part thereof, preferably below 1200° C. The parts thus obtained are sintered, depending on the composition, at between 1150° C. and 1300° C.

According to the present invention, the method of manufacturing improved maganese-zinc ferrites is characterized by a combined addition of calcium oxide and one metal oxide selected from the group consisting of $GeO_2$, $TiO_2$ and $SiO_2$ to the basic constituents for attainment of desirable characteristics. The amount of each of the additives is between 0.05 to 1.0% by weight. Particularly, a combined addition of $GeO_2$ and CaO markedly increases the resistivity of the ferrite, and thus extremely reduces the high-frequency loss, decreases in initial permeability, when it occurs, being kept low. Thanks to this improvement in losses, the value of $\mu \cdot Q$ of the novel ferrites becomes remarkably larger than that of prior ferrites.

According to the present invention, the high $\mu \cdot Q$ value is obtained by the addition of the said oxides only when the ferrite is subjected to a particular heat treatment specified as follows: a pressed body of a given composition is sintered at temperatures between 1150° C. and 1350° C. in nitrogen atmosphere containing 5 to 20% of oxygen and is thereafter slowly cooled in nitrogen atmosphere containing less than 0.5% oxygen. When the oxygen content in the sintering atmosphere is less than 5%, the effect of the additives does not occur, and the resistivity and the value of $\mu \cdot Q$ remains low. When the oxygen content in the cooling atmosphere is more than 0.5%, $\alpha\text{-}Fe_2O_3$ appreciably precipitates in the ferrites and remarkably decreases the permeability.

The specified additives and conditions of heat treatment according to the present invention will be better understood by the following description taken in conjunction with the accompanying drawings, in which:

FIG. 1 illustrates the relation between specific electric resistivity of manganese-zinc ferrite and additive amounts of various oxides;

FIG. 2 illustrates the effect of heat treatment on the electric resistivity of manganese-zinc ferrite containing various amounts of CaO; and FIG. 3 is a graphical illustration of electric resistivity of manganese-zinc ferrite containing various amounts of both $GeO_2$ and CaO.

Referring first to FIG. 1, the manganese-zinc ferrite is of the basic composition: 57 mol percent of $Fe_2O_3$, 29.5 mol percent of MnO and 13.5 mol percent of ZnO and contains 0.3 weight percentage of CaO and various amounts of one metal oxide selected from the group consisting of $SiO_2$, $GeO_2$, $SnO_2$, $TiO_2$ and PbO. It will be clearly seen that the resistivity of the manganese-zinc ferrite is increased remarkably by a combined addition of CaO and one metal oxide selected from $GeO_2$, $TiO_2$ and $SiO_2$, particularly by a combined addition of CaO and $GeO_2$.

The following Table I shows the electrical resistivity of manganese-zinc ferrites which are subjected to the same heat treatments in their preparation procedure, and contain combined additives of 0.3 wt. percent CaO and 0.3 wt. percent of another metal oxide as shown in Table I. These ferrites are prepared by mixing ferric oxide, manganese oxide and zinc oxide in molecular proportions of 57.0%, 29.5% and 13.5%, respectively, the manganese oxide being reckoned as MnO, though originally present in the form of $MnO_2$. It will be clear that of all the oxides which may be added to the ferrite, the combination of CaO and one metal oxide selected from $GeO_2$, $SiO_2$ and $TiO_2$ leads to an improvement in the resistivity and therefore high-frequency loss. Particularly, a great improvement of the above characteristics is obtained by an additive combination of CaO and $GeO_2$.

FIG. 2 is a graphical showing of effects of heat treatment on the electrical resistivity of manganese-zinc ferrites in the basic mole proportion of 29.5 mol percent of MnO, 13.5 mol percent of ZnO and 57.0 mol percent of $Fe_2O_3$, containing 0 to 0.5% of CaO by weight. The ferrites are sintered at 1225° C. for 2 hours in air or nitrogen and thereafter subjected to the following heat treatments: curve (a) is for ferrite sintered in air and furnace-cooled in nitrogen containing 0.2 percent of oxygen; curve (b) is for ferrite sintered in air and furnace-cooled in nitrogen; curve (c) is for ferrite sintered in air and rapidly cooled in nitrogen; curve (d) is for ferrite sintered in nitrogen and rapidly cooled in nitrogen. The rate of the furnace cooling is about 100° C./hour and that of rapid cooling, about 25° C./minute. FIG. 2 shows that the resistivity of manganese-zinc ferrite is strongly affected by a heat treatment. Of importance is that the highest resistivity is obtained with a heat treatment specified by sintering in air and furnace-cooling in nitrogen containing small amounts of oxygen, as indicated by curve (a). Similar results can be obtained even where the basic composition of ferrite and additives varies.

TABLE I

| Additive | Electrical Resistivity (ohm-cm.) | Additive | Electrical Resistivity (ohm-cm.) |
|---|---|---|---|
| CaO | 450 | $SiO_2$+CaO | 620 |
| $Na_2O$+CaO | 340 | $GeO_2$+CaO | 1,700 |
| $K_2O$+CaO | 290 | $SnO_2$+CaO | 440 |
| $Cs_2O$+CaO | 380 | PbO+CaO | 230 |
| CuO+CaO | 330 | $TiO_2$+CaO | 720 |
| $Al_2O_3$+CaO | 460 | $ZrO_2$+CaO | 140 |
| $Ga_2O_3$+CaO | 430 | $WO_3$+CaO | 420 |
| $In_2O_3$+CaO | 410 | | |
| $Tl_2O_3$+CaO | 400 | | |

FIG. 3 shows curves representing the resistivity of ferrites as a function of the weight percentage of additives $GeO_2$ and CaO. The quantitative indications, 1500 and so on, in the figure show that ferrite compositions within the curve exhibit the electric resistivity of 1500 ohm-cm. and so on, respectvely. These ferrites in a basic composition of 57.0 mol percent of $Fe_2O_3$, 29.5 mol percent of manganese oxide reckoned as MnO, and 13.5 mol percent of ZnO, are prepared by mixing the basic ingredients with 0 to 1.0% of CaO and 0 to 1.0% of $GeO_2$ by weight, pressing, sintering at 1250° C. in air for 2 hours and thereafter furnace-cooling in nitrogen containing less than 0.01% of oxygen.

It is seen that the resistivity decreases with an addition of $GeO_2$ but increases much more acceleratively with an addition of both $GeO_2$ and CaO than with a single addition of CaO. The highest resistivity obtained by CaO is only 500 ohm-cm. but that obtained by addition of both CaO and $GeO_2$ is 1500 ohm-cm. The additive amount showing the highest resistivity essentially consists of 0.1 to 0.5% of CaO and 0.05 to 0.5% of $GeO_2$ by weight. The resistivity decreases with an increase in each amount of CaO and $GeO_2$ when the additive amounts shift from a point of about 0.2 weight percent of $GeO_2$ and 0.25 weight percent of CaO. However, the resistivity again increases with increasing amount of each of $GeO_2$ and CaO where it is higher than 0.5% by weight. This increase in resistivity is due to the precipitation of $\alpha$-$Fe_2O_3$ in the ferrite matrix, which results in a remarkable decrease in the permeability.

The following examples are given to illustrate certain preferred details of the invention, it being understood that the details of the examples are not to be taken as in any way limiting the invention thereto.

EXAMPLE 1

Basic ingredients indicated in Table II and additive oxides shown in Table III are mixed with water in a steel ball mill.

TABLE II

| Designation of Basic Composition | Basic Composition | | |
|---|---|---|---|
| | $Fe_2O_3$ (mol percent) | MnO (mol percent) | ZnO (mol percent) |
| A | 55 | 31.5 | 13.5 |
| B | 57 | 29.5 | 13.5 |
| C | 59 | 27.5 | 13.5 |

The amounts and kinds of additive oxides are listed in Table III. After 16 hours of grinding, the slip is poured into a dish, and dried. The obtained powder is pressed, according to ceramic pressing techniques, into rings having dimensions of 37.5 mm. outside diameter, 23 mm. inside diameter, and 7 mm. height, or tablets having the diameter of 10 mm. and 7 mm. of height. The amount of pressure applied is about 0.5 to 1 t./cm.² The pressed bodies are sintered in a furnace at 1225° C. or 1250° C. for two hours in an air atmosphere, and thereafter furnace-cooled in a period of approximately 18 hours in a commercially available pure nitrogen gas atmosphere. The sintering temperatures are adjusted in a way to give the best result, as described in Table III. The ferrite rings are provided with Litz wire with 60 windings. The permeability and Q of these ferrites are measured with a Q-meter.

The magnetic properties of the ferrites are listed in Table III. It will be seen that the value of $\mu \cdot Q$ obtained by an addition of both $GeO_2$ and CaO markedly exceeds that by an addition of only CaO or $GeO_2$.

TABLE III

| Sample Number | Basic Composition [1] | Additives (wt. percent) | Sintering Temperature (°C.) | $\mu$ | Q (1 mc.) | $\mu \cdot Q$ (1 mc.) |
|---|---|---|---|---|---|---|
| 1 | A | 0.3% CaO | 1,225 | 980 | 40 | 39,200 |
| 2 | B | do | 1,225 | 800 | 60 | 48,000 |
| 3 | C | do | 1,225 | 630 | 75 | 47,200 |
| 4 | B | 0.1% CaO | 1,225 | 760 | 45 | 34,200 |
| 5 | B | 0.2% CaO | 1,225 | 805 | 50 | 40,200 |
| 6 | B | 0.5% CaO | 1,225 | 505 | 85 | 43,000 |
| 7 | A | 0.3% CaO and 0.2% GeO$_2$ | 1,250 | 860 | 55 | 47,300 |
| 8 | B | do | 1,250 | 710 | 115 | 81,600 |
| 9 | C | do | 1,250 | 510 | 155 | 79,000 |
| 10 | B | 0.3% CaO and 0.1% GeO$_2$ | 1,250 | 820 | 90 | 73,600 |
| 11 | B | 0.3% CaO and 0.3% GeO$_2$ | 1,250 | 710 | 110 | 78,000 |
| 12 | B | 0.3% CaO and 0.5% GeO$_2$ | 1,250 | 580 | 35 | 20,300 |
| 13 | B | 0.3% CaO and 1.0% GeO$_2$ | 1,250 | 560 | 15 | 8,400 |
| 14 | B | 0.2% GeO$_2$ | 1,250 | 2,010 | 10 | 20,100 |
| 15 | B | 0.2% GeO$_2$ and 0.1% CaO | 1,250 | 950 | 55 | 52,200 |
| 16 | B | 0.2% GeO$_2$ and 0.2% CaO | 1,250 | 840 | 80 | 67,200 |
| 17 | B | 0.2% GeO$_2$ and 0.5% CaO | 1,250 | 700 | 50 | 35,000 |

[1] See Table II.

The values of $\mu \cdot Q$ of the ferrites numbered as No. 9 and No. 10 in the Table III are measured in the frequency range from 0.3 to 3.0 mc./sec., and the results are shown in Table IV, wherein temperature coefficients $\alpha$ of the initial permeability at temperatures ranging from −40° C. to 100° C. are indicated. The coefficient is defined as $$\alpha = \frac{1}{\mu^2} \cdot \frac{\Delta \mu}{\Delta T}$$

where $\Delta \mu = \mu$ (at 100° C.) $-\mu$ (at −40° C.)
$\Delta T = (100° C.) - (-40° C.) = 140° C.$ It is clear that the manganese-zinc ferrites according to the present invention exhibit a low temperature-coefficient of initial permeability and high $\mu \cdot Q$-values at high frequency above 300 kc./s.

TABLE IV

| | $\mu$ | $\alpha$ | Frequency (mc./s.) | $\mu \cdot Q$ |
|---|---|---|---|---|
| Sample Number: | | | | |
| 9 | 710 | 0.7×10$^{-6}$ | 0.3 | 142,000 |
| | | | 0.3 | 124,000 |
| | | | 1.0 | 81,000 |
| | | | 1.5 | 50,000 |
| 10 | 510 | 2.0×10$^{-6}$ | 0.5 | 122,500 |
| | | | 1.0 | 79,000 |
| | | | 2.0 | 43,300 |
| | | | 3.0 | 25,500 |

EXAMPLE 2

Manganese-zinc ferrites are formed of a basic composition in various mole fractions and of combined additives of CaO and GeO$_2$ in a weight percent as listed in Table V. The preparation method is essentially the same as that of Example 1. The sintering and cooling conditions are adjusted in a way to give the best results, as indicated in Table V. Basic composition, additives, sintering conditions and properties of the obtained ferrites are also listed in Table V. It is clear that high value of $\mu \cdot Q$ is obtained by the specific heat treatment and additives described in Table V even where a basic composition of manganese-zinc ferrite varies.

TABLE V

| Sample Number | Basic Composition | | | Additives | | Sintering Temperature (°C.) | Sintering Atmosphere [1] | Cooling Atmosphere [1] | $\mu$ | Q (1 mc.) | $\mu \cdot Q$ (1 mc.) |
|---|---|---|---|---|---|---|---|---|---|---|---|
| | Fe$_2$O$_3$ (mol percent) | MnO (mol percent) | ZnO (mol percent) | CaO (wt. percent) | GeO$_2$ (wt. percent) | | | | | | |
| 1 | 56 | 24 | 20 | 0.3 | 0.2 | 1,200 | N$_2$+20% O$_2$ (air) | N$_2$+0.5% O$_2$ | 950 | 55 | 52,200 |
| 2 | 56 | 39 | 5 | 0.3 | 0.2 | 1,275 | Air | N$_2$+0.2% O$_2$ | 500 | 110 | 55,000 |
| 3 | 61.5 | 24.5 | 14 | 0.2 | 0.2 | 1,250 | N$_2$+10% O$_2$ | N$_2$ | 510 | 150 | 76,500 |
| 4 | 62.0 | 16 | 22 | 0.2 | 0.3 | 1,300 | N$_2$+5% O$_2$ | N$_2$+0.2% O$_2$ | 770 | 65 | 50,000 |
| 5 | 64.0 | 20 | 16 | 0.2 | 0.3 | 1,300 | N$_2$+5% O$_2$ | N$_2$ | 510 | 100 | 51,000 |

[1] Oxygen content is expressed by volume percent.

EXAMPLE 3

Manganese-zinc ferrites are formed of a basic composition consisting of 57 mol percent of Fe$_2$O$_3$, 29.5 mol percent of MnO, 13.5 mol percent of ZnO and combined additives of CaO and one metal oxide selected from SiO$_2$ and TiO$_2$ in various weight percents as shown in Table VI. The pressing and heat treatment are similar to those of the preceding examples, but sintering and cooling conditions are adjusted in a way to give the best results as indicated in Table VI. The properties and the additive oxides are listed in Table VI. It will be seen that a combined addition of CaO and SiO$_2$ or TiO$_2$ improves the $\mu \cdot Q$ characteristic more effectively than a single addition of CaO does.

TABLE VI

| | Additives (wt. percent) | Sintering Temperature (°C.) | Sintering Atmosphere | Cooling Atmosphere | $\mu$ | Q (1 mc.) | $\mu \cdot Q$ (1 mc.) |
|---|---|---|---|---|---|---|---|
| Sample Number: | | | | | | | |
| 1 | 0.3% CaO | 1,225 | In air | N$_2$ | 800 | 60 | 48,000 |
| 2 | 0.3% CaO and 0.1% SiO$_2$ | 1,250 | do | N$_2$+0.2% O$_2$ | 840 | 70 | 59,000 |
| 3 | 0.3% CaO and 0.5% TiO$_2$ | 1,270 | do | N$_2$ | 710 | 80 | 56,800 |

EXAMPLE 4

Manganese-zinc ferrites which have the same basic composition as that of Example 3 are prepared by adding 0.3% of CaO and 0.05 to 1.0% of SiO$_2$ by weight, sintering at 1250° C. for 2 hours in air and furnace-cooling in pure nitrogen atmosphere. The properties of these ferrites are listed in Table VII. It is clear that the $\mu \cdot Q$ value increases with an addition of 0.3% of CaO and 0.5% of SiO$_2$ by weight but decreases when additive content of SiO$_2$ exceeds 1.0% by weight.

TABLE VII

| Sample Number | Additives (wt. percent) | $\mu$ | Q (1 mc.) | $\mu \cdot Q$ (1 mc.) |
|---|---|---|---|---|
| 1 | 0.3% CaO and 0.05% SiO$_2$ | 1,040 | 55 | 52,000 |
| 2 | 0.3% CaO and 0.1% SiO$_2$ | 840 | 70 | 59,000 |
| 3 | 0.3% CaO and 0.3% SiO$_2$ | 670 | 80 | 53,500 |
| 4 | 0.3% CaO and 0.5% SiO$_2$ | 570 | 80 | 45,600 |
| 5 | 0.3% CaO and 1.0% SiO$_2$ | 510 | 75 | 38,300 |

EXAMPLE 5

Manganese-zinc ferrites are formed of the same basic composition as that of Example 3 and of additives of 0.3% CaO and 0.3 to 1.0% $TiO_2$ by weight. The preparation procedure prior to sintering is essentially the same as that of Example 1. The pressed body is sintered at 1270° C. for 2 hours in air and furnace-cooled in $N_2$. The properties of the ferrites are listed in Table VIII. It is clear that a combined addition of 0.3% CaO and 0.3 to 1.0% $TiO_2$ by weight improves the $\mu \cdot Q$ characteristics.

TABLE VIII

| Sample Number | Amount of Additives (wt. percent) | | $\mu$ | Q (1 mc.) | $\mu \cdot Q$ (1 mc.) |
|---|---|---|---|---|---|
| | CaO | $TiO_2$ | | | |
| 1 | 0.3 | 0.3 | 850 | 60 | 51,000 |
| 2 | 0.3 | 0.5 | 710 | 80 | 56,800 |
| 3 | 0.3 | 1.0 | 530 | 95 | 50,400 |

Additions of metal oxides and the specified heat treatment clearly have effects to obtain the ferrite having high $\mu \cdot Q$-value even where the basic compositions of ferrite differ from those described in the specification and examples. It should be understood that the symbols used for designating the characteristics of the ferrite composition, described herein, have their conventional meanings, namely, $\mu$ means permeability; Q means the ratio of the inductive reactance to the effective series resistance; $N_2$ and $O_2$ mean nitrogen and oxygen gas respectively.

What is claimed is:

1. A sintered composition consisting essentially of (a) manganese-zinc ferrite which consists essentially of 54 to 65 mol percent of $Fe_2O_3$, 4 to 22 mol percent of ZnO and the balance being MnO, and (b) as an additive combination, 0.05 to 1% by weight of $GeO_2$ and 0.05 to 1% by weight of CaO.

2. A sintered manganese-zinc ferrite composition as defined in claim 1, wherein said weight proportion of $GeO_2$ is 0.05 to 0.5% and of CaO is 0.1 to 0.5%.

References Cited

UNITED STATES PATENTS

| 3,027,327 | 3/1962 | Blank | 252—62.62 |
| 3,106,534 | 10/1963 | Akashi et al. | 252—62.62 |

TOBIAS E. LEVOW, *Primary Examiner.*

ROBERT D. EDMONDS, *Assistant Examiner.*

U.S. Cl. X.R.

252—62.62, 62.63